US012175560B2

United States Patent
Lenke et al.

(10) Patent No.: US 12,175,560 B2
(45) Date of Patent: Dec. 24, 2024

(54) TOURING CIRCUITRY FOR AN IMMERSIVE TOUR THROUGH A TOURING THEATER

(71) Applicant: Cerence Operating Company, Burlington, MA (US)

(72) Inventors: Nils Lenke, Aachen (DE); Duygu Kanver, Farmington Hills, MI (US); Marina Matveevskaia, Aachen (DE)

(73) Assignee: Cerence Operating Company, Burlington, MA (US)

( * ) Notice: Subject to any disclaimer, the term of this patent is extended or adjusted under 35 U.S.C. 154(b) by 421 days.

(21) Appl. No.: 17/315,759

(22) Filed: May 10, 2021

(65) Prior Publication Data

US 2022/0358687 A1 Nov. 10, 2022

(51) Int. Cl.
| | | |
|---|---|---|
| *G06T 11/00* | (2006.01) | |
| *G06T 19/00* | (2011.01) | |
| *H04W 4/021* | (2018.01) | |
| *H04W 4/029* | (2018.01) | |
| *H04W 4/44* | (2018.01) | |

(52) U.S. Cl.
CPC ............ *G06T 11/00* (2013.01); *G06T 19/006* (2013.01); *H04W 4/021* (2013.01); *H04W 4/029* (2018.02); *H04W 4/44* (2018.02)

(58) Field of Classification Search
CPC ........ G06T 11/00; G06T 19/006; H04W 4/44; H04W 4/029; H04W 4/021

USPC .......................................................... 345/633
See application file for complete search history.

(56) References Cited

U.S. PATENT DOCUMENTS

| | | | |
|---|---|---|---|
| 2013/0006521 A1* | 1/2013 | Needham | G01C 21/343 |
| | | | 701/426 |
| 2016/0089610 A1* | 3/2016 | Boyle | A63F 13/28 |
| | | | 463/7 |
| 2017/0323482 A1* | 11/2017 | Coup | G06F 3/011 |
| 2018/0253141 A1* | 9/2018 | McCracken | A63F 13/26 |
| 2018/0328751 A1* | 11/2018 | Bejot | G01C 21/3608 |
| 2019/0336864 A1* | 11/2019 | Magpuri | A63F 13/69 |
| 2020/0098190 A1* | 3/2020 | Goergen | A63F 13/843 |
| 2020/0223444 A1* | 7/2020 | Bonanni | B60W 40/08 |
| 2021/0274314 A1* | 9/2021 | Braunschweiler | |
| | | | H04N 21/8541 |
| 2022/0124143 A1* | 4/2022 | Rafkind | H04L 65/60 |

* cited by examiner

*Primary Examiner* — Jin Ge
(74) *Attorney, Agent, or Firm* — Occhiuti & Rohlicek LLP

(57) ABSTRACT

Touring circuitry for managing an immersion tour as a vehicle traverses a path through a touring theatre receives location information and provides control signals to an augmented-reality system based on a location of the vehicle in the touring theater. The control signals cause the augmented-reality system to stimulate at least two sensory inputs of a passenger.

26 Claims, 4 Drawing Sheets

TOURING CIRCUITRY FOR AN IMMERSIVE TOUR THROUGH A TOURING THEATER

BACKGROUND

It is often the case that people will wish to tour a region that is of some significance. Such significance may arise for historical reasons, because of the region's scenery or architecture, or because of the presence of various cultural artifacts.

A difficulty that can arise is that a tourist can easily overlook the full significance of the various attractions. In addition, since the region may be unfamiliar to the tourist, one runs the risk of becoming lost.

To overcome these difficulties, it is known to hire a professional guide or to take a guided tour, perhaps on a bus with other tourists. However, hiring a guide can be expensive. And sharing a bus with strangers can be oppressive.

It is known to carry out a guided tour with a private vehicle using, for example, a guidebook and a map. However, there remain difficulties in carrying out such a tour, even with a good guidebook. These difficulties arise in part from having to divide one's attention between the tour and operating the vehicle. The tension between learning as much as possible while driving through the region and attempting to find one's way, particularly with passengers who may lack patience, is a source of stress.

The advent of global-positioning systems has made it possible to solve one of these problems, namely that of becoming lost. However, the global-positioning system is not much help in the former problem. Although the global-positioning system knows where it is and how to go places, it is unable to deliver information of more significant interest.

It is also known to couple the output of the global-positioning system with a database and a speech-processing system, thereby creating a location-aware virtual tour-guide that can provide a narrative that will engage the vehicle's passengers. However, speech alone faces limits in its ability to engage the passengers' full attention.

SUMMARY

In one aspect, the invention features an apparatus for managing an immersion tour as a vehicle traverses a path through a touring theater. the apparatus includes touring circuitry and an augmented-reality system. The touring circuitry receives location information and provides control signals to the augmented-reality system based on a location of the vehicle in the touring theater. These control signals cause the augmented-reality system to stimulate at least two sensory inputs of a passenger.

In some embodiments, the touring theater encompasses public ways that are used for purposes other than an immersion tour. In others, the touring theater is used only for an immersion tour.

Embodiments further include those in which the vehicle is an autonomous vehicle.

Embodiments include those in which the augmented-reality system includes one or more of an audio system, a lighting system that provides programmed illumination of the vehicle's interior, an olfactory stimulator that releases odors, a temperature controller that controls the vehicle's internal temperature, a precipitator that simulates precipitation, a haptic system that exerts forces against the passenger, a video system, and a projection system.

In some embodiments, the augmented-reality system is a first augmented-reality system, and the apparatus also includes a second augmented-reality system, wherein the touring circuitry provides control signals to the second augmented-reality system. This second augmented-reality system causes an event to occur in the theater in response to location of the vehicle.

Among the embodiments are those in which, in response to locations of the vehicle in the theater, the touring circuitry carries out one or more of cueing a live actor in the theater, triggering a special effect in the theater, and triggering a lighting system in the theater.

Embodiments further include those in which the touring circuitry is disposed in the vehicle, those in which the touring circuitry is disposed remotely from the vehicle and wirelessly controls the augmented-reality system, and those in which it is partly in the vehicle and partly remote form the vehicle.

In some embodiments, the touring circuitry includes a filter that selects one or more immersion tours for presentation to the passenger based on constraints, the constraints including distance to the theater, time constraints on the immersion tour, and meteorological constraints.

In other embodiments, the touring circuitry includes an itinerary database that stories itineraries for immersion tours.

In still other embodiments, the touring circuitry includes a tour manager that provides control signals to the augmented-reality system based on an itinerary and on location information.

Also, among the embodiments are those in which the touring circuitry includes a passenger interface that comprise a cancellation control for stopping an immersion tour after the immersion tour has begun. and those in which the touring circuitry includes a passenger interface that comprise an immersion control for controlling an extent of immersion of the immersion tour.

Still other embodiments feature a pre-tour storage unit configured to store settings of subsystems of the first augmented-reality system prior to beginning an immersion tour.

In other embodiments, the vehicle is one of two or more vehicles that are controlled by the touring circuitry. In such embodiments, the touring circuitry controls augmented-reality systems of both vehicles such that both are coupled to each other by the touring circuitry.

Embodiments include those in which various other systems within the vehicle provide their own respective sensor inputs. For example, a vehicle may have a GPS device that outputs directions in both visual and audible form, thus providing two sensory inputs. Similarly, a radio that displays the station it is tuned to would provide audible input and visual input. Or, a dashboard may display a warning light and an audible beep when the seat belts are not fastened or when the door is open. Such systems are independent and distinct from the touring circuitry.

Embodiments also include those in which vehicles include systems that display alternate realities, such as those in which a vehicle has a screen that is used for showing movies to passengers. These displays are distinct from those implemented by the augmented-reality system.

In another aspect, the invention features a method that includes managing an immersion tour undertaken by a vehicle moving along a path through a theater. Such a method includes receiving information indicative of a vehicle's location in the theater and controlling an augmented-reality system in the vehicle based at least in part on the information.

In some practices, the method includes receiving a selection of an immersion tour from a passenger in the vehicle, retrieving an itinerary for the immersion tour, and using the itinerary, to provide control signals to the augmented-reality system.

Also, among the practices are those that include controlling theater dressing in the theater.

Still other practices include, upon receiving a selection of an immersion tour from a passenger of the vehicle, prior to arriving at the theater, transmitting a signal to begin preparation of theater dressing in the theater.

All embodiments described herein are non-abstract embodiments. While abstract embodiments exist, they have purposefully been omitted from this description. All embodiments as well describe a technical effect.

Other features and advantages of the invention are apparent from the following description, and from the claims.

DETAILED DESCRIPTION

Figure 1:
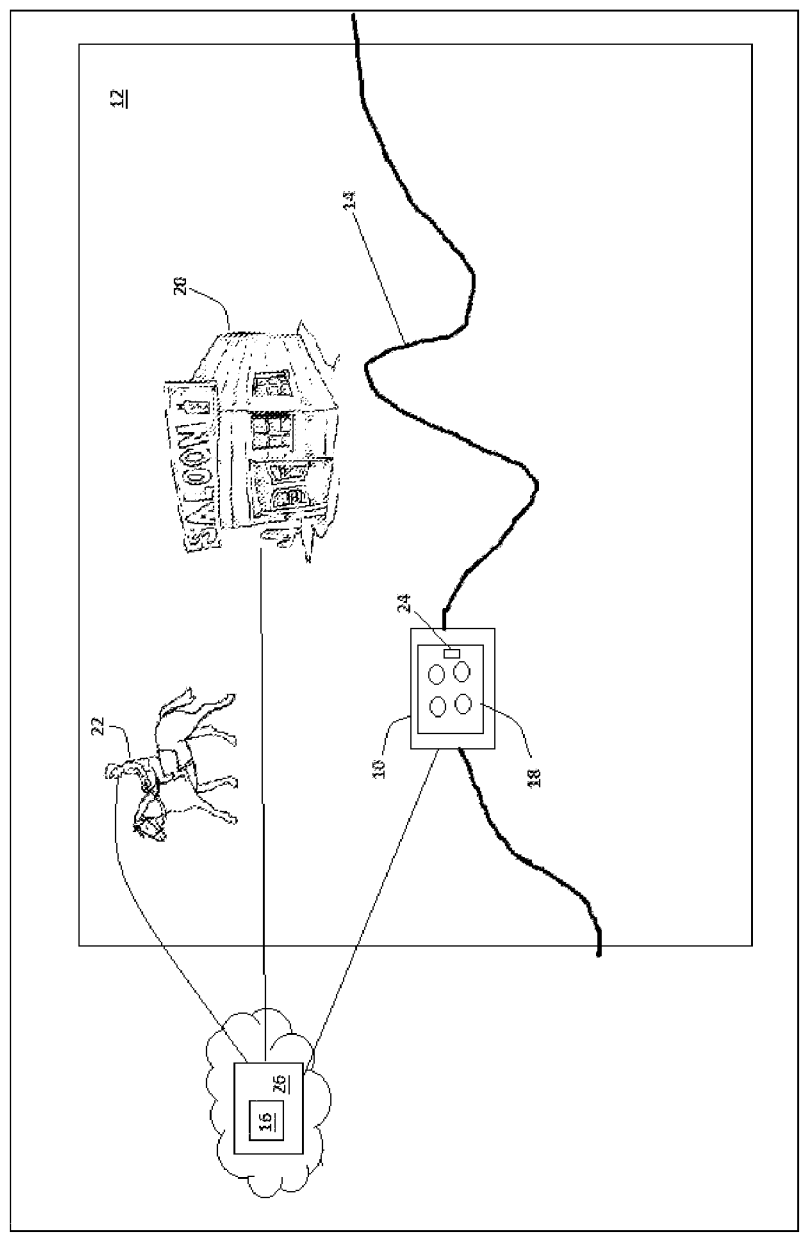
FIG. 1 shows a path of a vehicle environment through a theater of operations.

FIG. 1 shows a vehicle 10 traversing a theater 12 along a path 14. The term "theater" is intended to refer to a "theater of operations" and not to a building that houses an auditorium.

As the vehicle 10 traverses the path 14, touring circuitry 16 responds to the vehicle's location by causing changes to the vehicle 10 and, optionally, to the theater 12. These changes cause passengers 18 of the vehicle 10 to experience certain multi-media special effects as part of an immersive tour.

In a typical embodiment, the vehicle 10 carries one or more passengers 18 who wish to experience the immersive tour under the guidance of the touring circuitry 16.

The immersive tour is best enjoyed by surrendering one's full attention. Accordingly, in a preferred embodiment, the vehicle 10 is autonomous. It is particularly useful if the vehicle 10 enjoys a high level of autonomy. As used herein, a "high level" of autonomy is level four or level five based on the standard promulgated by the Society of Automotive Engineers as of the filing date of this application. In such embodiments, the touring circuitry 16 controls the tour directly by interfacing with the controls of the autonomous vehicle 10. For example, in a scenario in which the autonomous vehicle is chasing another vehicle, the touring circuitry 16 would control the vehicle to accelerate.

In some embodiments, the theater 12 encompasses public thoroughfares. In some examples, the theater 12 encompasses a historic portion of a city or a collection of nearby areas of significance. In other embodiments, the theater 12 encompasses scenic areas or national parks.

In other embodiments, the theater 12 is restricted to designated areas that have been configured to safely carry out the methods described herein for controlling one or both of the vehicle and the theater 10, 12.

In either case, the theater 12 may include specially built dressing 20 or live actors 22 to enhance the immersive tour. In some cases, the touring circuitry 16 communicates with the theater dressing 20 and actors 22 via a communication link. As used herein, the term "theater dressing" includes props, set pieces, staging, lighting, and other features, both stationary and moving, that are used in the theater industry to promote a more immersive experience.

The touring circuitry 16 will need to know the vehicle's location along the path 14 to correctly time the various environmental manipulations that it carries out as part of the immersive tour. For this purpose, it is useful for the vehicle 10 to have a global-positioning system 24 that is in communication with the touring circuitry 16.

The physical location of the touring circuitry 16 is not of great importance. In some embodiments, the touring circuitry 16 is implemented entirely within the vehicle 10. In others, it is implemented on a cloud-based server 26 that is communication with the vehicle 10 over a wireless network. In still other embodiments, the touring circuitry 16 is distributed between the cloud-based server 26 and the vehicle 10.

Figure 2:
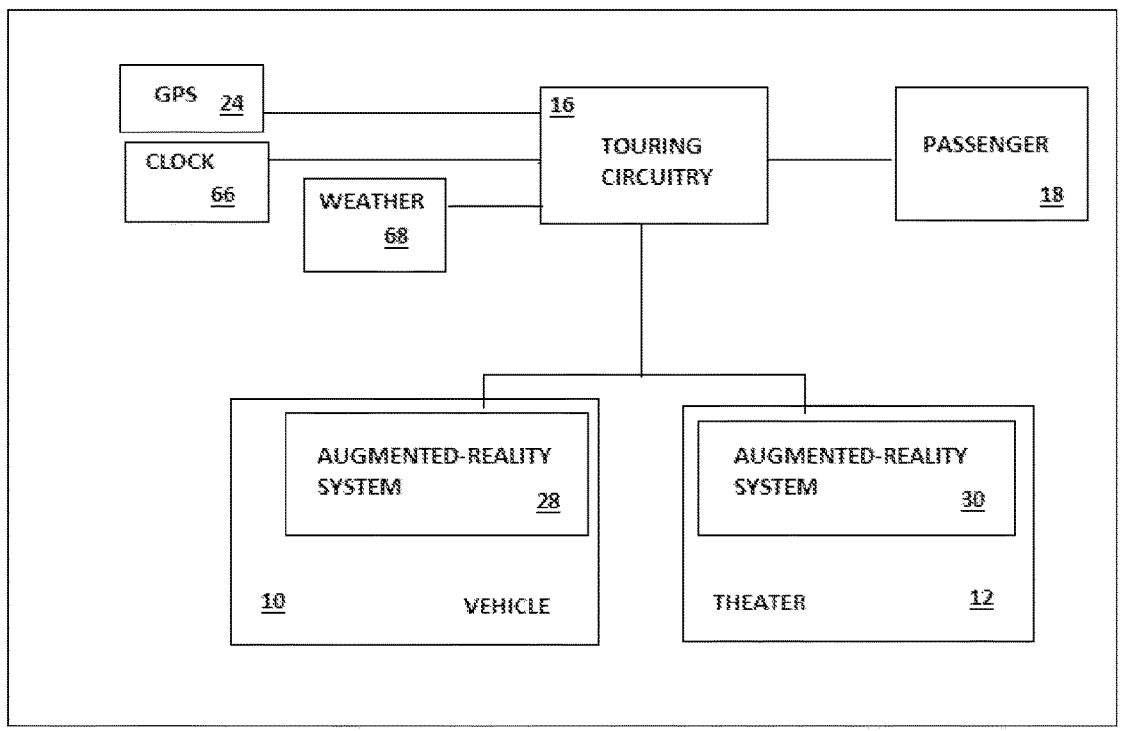
FIG. 2 shows the use of the touring circuitry in FIG. 1 to manipulate the theater and vehicle of FIG. 1.

FIG. 2 shows the overall control flow for implementing an immersive tour. The global-positioning system 24 provides the touring circuitry 16 with information indicative of the vehicle's location. Based on this location, the touring circuitry 16 transmits control signals to a first augmented-reality system 28 and, optionally, to a second augmented-reality system 30.

As the vehicle's location along the path 14 changes, the touring circuitry 16 updates the control signal. This choreographs the immersive tour so that the various multimedia effects will occur at the correct times when the vehicle 10 is in the correct location along the path 14.

Figure 3:
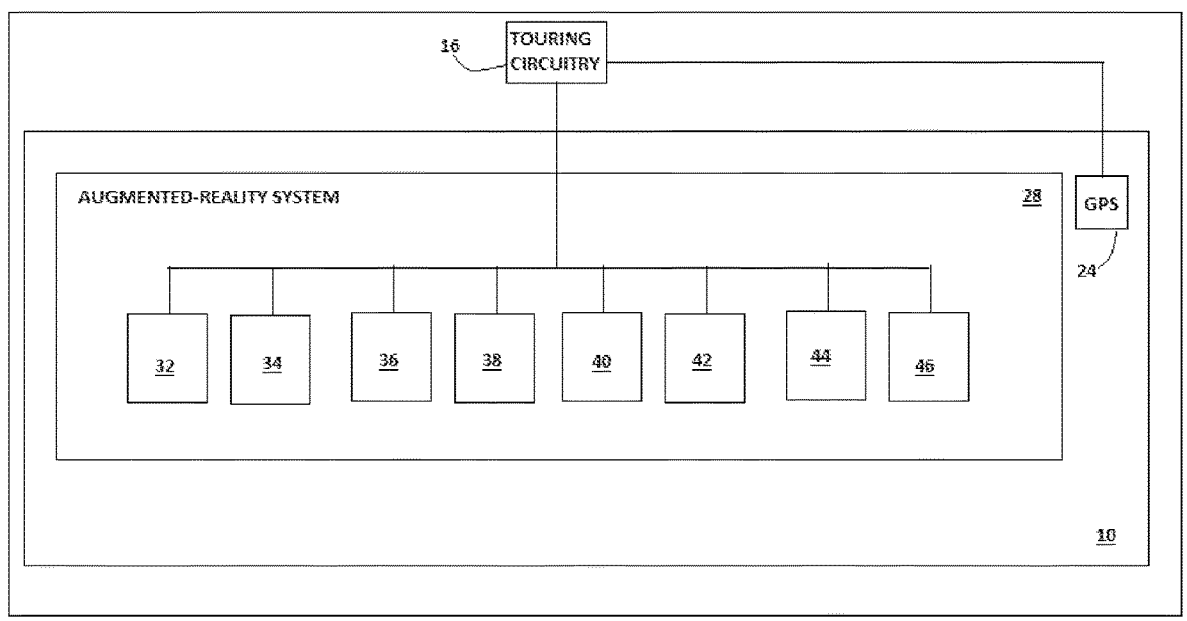
FIG. 3 shows details of the first augmented-reality system of FIG. 2.

Referring now to FIG. 3, the first augmented-reality system 28 is a multi-modal system that features modes for stimulating one or more of a human's various senses. These include vision, hearing, touch, and smell.

To implement the first augmented-reality system 28, the vehicle 10 takes control of various subsystems. These subsystems include an audio system 32, a lighting system 34, an olfactory-stimulator 36, a temperature controller 38, a precipitator 40, a haptic system 42, a video system 44, and a projection system 46.

The touring circuitry 16 causes the audio system 32 to play stored audio files that may be called upon as needed. Examples include topical music and environmental noises, such as gunshots, barking dogs, sounds of horses' hooves on cobblestone, explosions, sirens, and the like.

The touring circuitry 16 also causes the lighting system 34 to simulate topical effects, such as flashing or flickering to simulate the effect of fire or explosions. In some embodiments, the lighting system 34 features strobe lights of various colors to simulate, for example, lightning or emergency-vehicle lights.

The touring circuitry 16 causes the olfactory stimulator 36 to release various odors when the vehicle 10 arrives at particular locations along the path 14. A suitable olfactory stimulator 36 features addressable vials of odoriferous substances that are broken or dissolved on cue to release the relevant scent.

Preferably, the touring circuitry 16 synchronizes the modes of the first augmented-reality system 28. For example, if the immersive tour concerns a battle that was fought in the theater 12 that is being driven through, the touring circuitry 16 causes the audio system 32 and the lighting system 34 to output the sound of a cannonade and its associated flash with a suitable delay that depends on the actual locations of cannons relative to the location of the vehicle 10. This delay would then be reduced as the vehicle 10 approaches the historical location of the cannon battery. As the vehicle 10 approaches the historical location of cannon battery, one might expect the scent of gunpowder to grow more detectable until it attains significant pungency. Accordingly, the touring circuitry 16 would cause the olfactory stimulator 36 to release the scent of gunpowder.

The touring circuitry 16 causes the temperature controller 38 to vary the vehicle's internal temperature based on the vehicle's location. Thus, if the subject matter of the immersive tour involves the origin of various topographic features within the theater 12, such as moraines or kettle hole ponds, the touring circuitry 16 may cause the temperature controller 38 to drive the car's internal temperature quite low while the audio system 32 discusses a retreating glacier that covered the theater 12 to form such features.

The touring circuitry 16 also exercises control over a precipitator 40. Examples of a precipitator 40 include the windshield sprayer of a typical vehicle 10. In some embodiments, the sprayer offers adjustable nozzles to simulate mist, drizzle, heavy rain, and everything in between. Other embodiments feature a refrigeration unit to enable water vapor to condense directly into solid flakes, which can then be blown against the windshield to simulate snow fall, for example in connection with an immersive tour concerning the retreating glacier. Other embodiments feature a nebulizer to form a mist within the vehicle.

The touring circuitry 16 also activates the haptic system 42 at times that depend on the vehicle's location within the theater 12. By suitable activation, the touring circuitry 16 causes the haptic system 42 to simulate a rough ride. For example, if an immersive tour concerns a colonial-era city, the haptic system 42 simulates the vibrations associated with driving over cobblestone, including adjusting the vibrations based on the vehicle's speed, while the audio system outputs the sound of driving over cobblestone, perhaps incorporating the sounds of horse-drawn carriages with a suitable Doppler shift superimposed to match the vehicle's speed. In other examples, the haptic system 42 carries out a seat massage, simulates a rough ride, or simulates the effect of a nearby virtual explosion.

Similarly, when the subject matter of the immersive tour is a battle fought within the theater 12, the touring circuitry causes the haptic system 42 to vibrate the seats at times that corresponds to explosions of shells, the light flashes of which are taken care of by the lighting system. Examples of a haptic system 42 include those in which seats are actuated by piezoelectric actuators and those in which the vehicle's suspension system is augmented by electromagnetic shock absorbers that can be actuated to simulate various road surfaces.

The touring circuitry 16 also controls a video system 44 by showing images that are relevant to the subject matter of the immersive tour. Preferably, the video system 44 features a sizable display that will show images that are large enough to promote immersion in the immersive tour.

The touring circuitry 16 also controls a projection system 46. Examples of projection systems 46 includes goggles and heads-up displays. The touring circuitry 16 uses the projection system 46 to project images that augment the scenery outside. For example, in the case in which the immersive tour concerns the theater's state during an ice age, the augmented-reality projection system 46 may project an image of a mastodon.

The second augmented-reality system 30 exercises control over features that are part of the theater 12, as shown in FIG. 1. This second augmented-reality system 30 is optional. An immersive tour can be carried out using only the first augmented-reality system 28.

Figure 4:
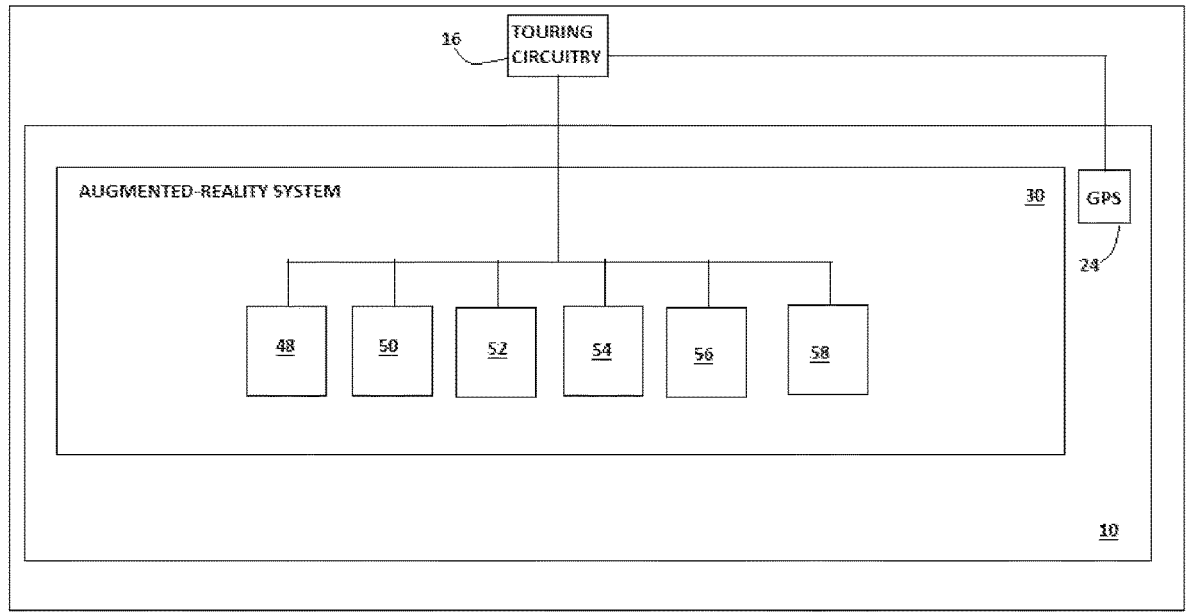
FIG. 4 shows details of the second augmented-reality system shown in FIG. 2.

Referring to FIG. 4, The second-augmented reality system 30 features include a cast 48 of one or more live actors 22 that are made to enter on cue as the vehicle approaches, lighting units 50 associated with buildings or other features, machinery 52 that can be made to operate, including such animatronic units to simulate animals or other animated beings, special-effects units 54 that are cued to simulate explosions, lightning strikes, or other unexpected events, scenery 56, and a crew of handlers 58 that may be required to intervene in the management of the theater 12 in an effort to choreograph the various activities in the theater 12 as the vehicle passes through. The second augmented-reality system 30 orchestrates the activity of the various features of the theater 12 based on the vehicle's location along the path 14 through the theater 12.

In some embodiments, the touring circuitry 16 sends control signals to two or more vehicles 10 concurrently. This occurs in those cases in which the vehicles 10 interact as part of an immersive tour. For example, the touring circuitry 16 may cause one vehicle to give chase to another, while controlling the first virtual-reality systems 28 of each vehicle 10 to create the relevant sensory stimuli to promote a sense of reality, thus enhancing the immersion experienced by the vehicles' passengers 18.

Figure 5:
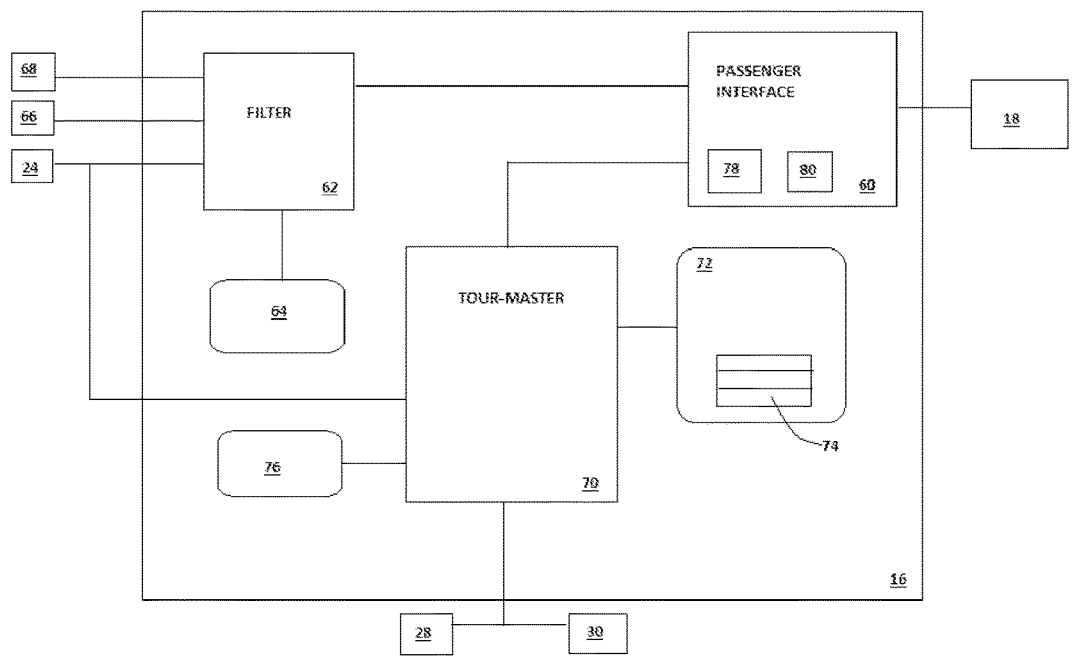
FIG. 5 shows details of the touring circuitry of FIG. 2.

Referring to FIG. 5, in one implementation, the touring circuitry 16 includes a user interface 60 that a passenger's request for an immersive tour. The user interface 60 provides the request to a filter 62, which connects to a tour database 64. The tour database 64 maintains a list of immersion tours, their locations, and estimates of the time required for each immersion tour.

The filter 62 requests that the global-positioning system 24 provide location and heading information. Based on the resulting location and heading information, the filter 62 carries out spatial filtering by identifying, from the tour database 70, nearby theaters 12 that are appropriate for an immersive tour.

Similarly, the filter 62 receives local time from a clock 66 and determines whether, based on an estimated travel time to the theater 12 and the duration of the immersion tour, whether the immersive tour can be completed within an imposed time constraint. Such time constraints arise, for example, when an immersion tour must be completed in daylight or before the live actors 22 pack up and go home. This amounts to temporal filtering.

In some embodiments, there are meteorological constraints on the tour. For example, certain immersion tours may not be practical in snow. To accommodate such constraints, the filter 62 receives weather information from a weather server 68 for weather at the theater 12. This amounts to meteorological filtering.

Following the filtering procedure, the filter 62 provide a list of practicable immersion tours to the user interface 60, which then presents them for the passenger's consideration.

Upon receiving a selection from the passenger, the user-interface 60 communicates with the global-positioning system 24 to cause a route to the relevant theater 12 to be plotted and for navigation to commence. In the case of an autonomous vehicle 10, the global-positioning system 24 announces the course change to avoid alarming the passengers 18 of the vehicle 10.

Additionally, the user-interface 60 provides the selection to a tour-master 70.

The tour-master 70 communicates with an itinerary database 72, which stores itineraries 74 for each of the tours in the tour database 64. Each itinerary 74 includes relevant narration to played through the audio system 32. In addition, the itinerary 74 includes commands that are to be provided to the first and second augmented-reality systems 28, 30.

In some cases, certain commands must be sent immediately to the second augmented-reality system 30. For example, actors 22 may need to be roused and crews may need to be alerted to check the dressing 20 for operability. In some embodiments, particularly those that rely on an autonomous vehicle 10, the tour-master 70 causes the vehicle 10 to slow down slightly to permit sufficient time for the theater 12 to be prepared.

During the immersive tour, the first augmented-reality system 28 will be taking over operation of various subsystems referred to in connection with FIG. 3. It is therefore useful to save the current settings corresponding to non-augmented reality in a pre-tour storage unit 76 as the vehicle 10 approaches the theater 12 to begin the immersive tour. At the end of the immersive tour, these settings are then retrieved from the pre-tour storage unit 76 and applied to the various subsystems, thereby restoring the vehicle 10 to its pre-tour operational state.

Once the vehicle reaches the theater 12 and begins on the path 14, the tour-master 70 begins transmitting commands to the first and second augmented-reality systems in a manner that choreographs the immersive tour based on location along the path 14. The relevant sequence of commands and any narration that accompanies the immersive tour is encoded in the itinerary 74 that has been retrieved from the itinerary database 74.

In some embodiments, it is useful for the touring circuitry 16 to include an abort button 78 that aborts the immersive tour. This may be necessary if one or more passengers 18 prove to have sensibilities that are somehow incompatible with the immersive tour's level of realism. Other embodiments feature an immersion controller 80 that an occupant 18 may use to dial down the level of realism to something more comfortable. For example, at some settings of the immersion controller 80, one or more of the subsystems in FIG. 3 will be suppressed.

Figure 6:
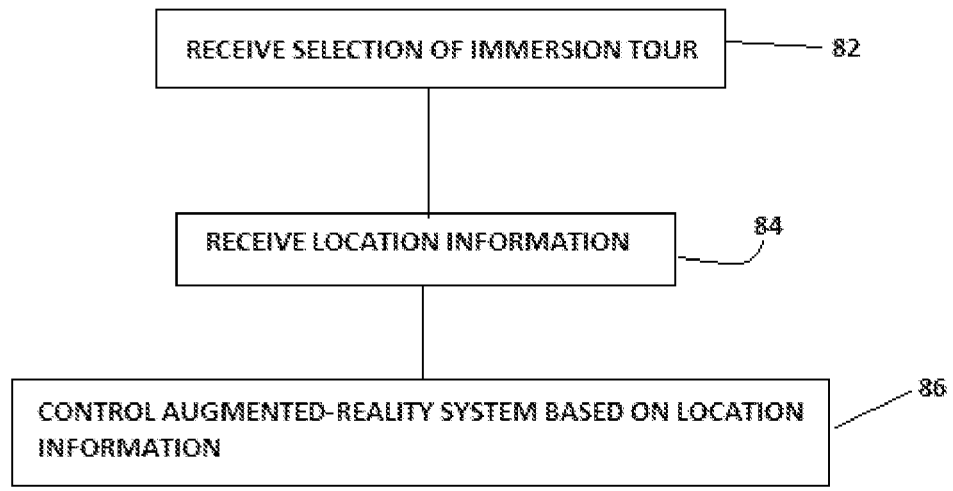
FIG. 6 shows a flow-chart of a method carried out by the touring circuitry of FIG. 1.

FIG. 6 shows a method carried out by the touring circuitry 16. The method begins with receiving a selection of an immersion tour (step 82) and is followed by receiving location information indicative of the vehicle's location along a path 14 in the theater 12 (step 84). Based at least in part on this location information, the touring circuitry 16 controls the augmented-reality system 28, 30 (step 86).

It is to be understood that the foregoing description is intended to illustrate and not to limit the scope of the invention, which is defined by the scope of the appended claims. Other embodiments are within the scope of the following claims.

What is claimed is:

1. An apparatus comprising a tour database, a user interface, touring circuitry, and an augmented-reality system; wherein said tour database maintains a list of immersion tours; wherein said user interface receives, from a passenger in a vehicle that is configured for use on public thoroughfares, a selection of an immersion tour for communication to said touring circuitry; wherein said touring circuitry manages said selected immersion tour as said vehicle traverses a path through a touring theater that corresponds to said selected immersion tour; wherein said touring circuitry is configured to receive location information from a global-positioning system that is in said vehicle and external to said touring circuitry and that provides a location of said vehicle while said vehicle is in said touring theater; wherein said touring circuitry is further configured to retrieve an itinerary for said selected immersion tour and to use said itinerary to select control signals, and to provide said control signals to said augmented-reality system based on said location of said vehicle in said touring theater; and wherein said control signals cause said augmented-reality system to stimulate at least two sensory inputs of said passenger.

2. The apparatus of claim 1, wherein said touring circuitry comprises a map of said touring theater and wherein said map encompasses public ways.

3. The apparatus of claim 1, wherein said touring circuitry comprises a map of said touring theater and wherein said map excludes public ways.

4. The apparatus of claim 1, wherein said vehicle is an autonomous vehicle and said touring circuitry comprises control circuitry for interfacing with controls of said autonomous vehicle.

5. The apparatus of claim 1, wherein said augmented-reality system comprises an audio system, a lighting system that provides programmed illumination of said vehicle's interior, an olfactory stimulator that releases odors, a temperature controller that controls said vehicle's internal temperature, a precipitator that simulates precipitation, a haptic system that exerts forces against said passenger, a video system, and a projection system.

6. The apparatus of claim 1, wherein said augmented-reality system is a first augmented-reality system, wherein said first augmented reality system controls said vehicle, wherein said apparatus further comprises a second augmented-reality system, wherein said touring circuitry provides control signals to said second augmented-reality system, and wherein said second augmented-reality system causes an event to occur in said theater in response to location of said vehicle.

7. The apparatus of claim 1, wherein, in response to locations of said vehicle in said theater, said touring circuitry cues a live actor in said theater, triggers a special effect in said theater, and triggers a lighting system in said theater.

8. The apparatus of claim 1, wherein said touring circuitry is disposed in said vehicle.

9. The apparatus of claim 1, wherein said touring circuitry is disposed remotely from said vehicle and wirelessly controls said augmented-reality system.

10. The apparatus of claim 1, wherein said touring circuitry comprises a filter that selects one or more immersion tours for presentation to said passenger based on constraints, said constraints including distance to said theater, time constraints on said immersion tour, and meteorological constraints.

11. The apparatus of claim 1, wherein said touring circuitry comprises an itinerary database that stores itineraries for immersion tours.

12. The apparatus of claim 1, wherein said touring circuitry comprises a tour manager that provides control signals to said augmented-reality system based on an itinerary and on location information.

13. The apparatus of claim 1, wherein said touring circuitry comprises a passenger interface that comprises a cancellation control for stopping an immersion tour after said immersion tour has begun.

14. The apparatus of claim 1, wherein said touring circuitry comprises a passenger interface that comprise an immersion control for controlling an extent of immersion of said immersion tour.

15. The apparatus of claim 1, wherein said touring circuitry comprises a pre-tour storage unit configured to store settings of subsystems of said first augmented-reality system prior to beginning an immersion tour.

16. The apparatus of claim 1, wherein said vehicle is a first vehicle, wherein said touring circuitry controls an augmented-reality system of one or more second vehicles such that said first vehicle and said one or more second vehicles are coupled to each other by said touring circuitry.

17. The apparatus of claim 1, wherein said theater comprises a portion of a national park.

18. The apparatus of claim 1, wherein said theater comprises a designated historic portion of a city.

19. The apparatus of claim 1, further comprising a filter that connects to said tour database, wherein said filter requests that said global-positioning system provide location and heading information of said vehicle and, based on said location and heading information, said filter identifies, from said tour database, theaters that are appropriate for an immersion tour given said location and heading information.

20. The apparatus of claim 1, further comprising a clock that provides local time and a filter that connects to said tour database, wherein said filter receives local time from said clock and information indicative of a duration of said selected immersion tour from said tour database, wherein said filter determines, based on said duration of said selected immersion tour and an estimate of travel time to said theater whether said immersion tour can be completed within an imposed time constraint.

21. The apparatus of claim 1, further comprising a filter that connects to said tour database and to a weather server, wherein said filter receives weather information from said weather server, said weather information being indicative of weather at said touring theater and wherein, based on said weather information, said filter determines whether an immersion tour at said theater is practicable.

22. The apparatus of claim 1, wherein said global-positioning system plots a route to said theater and begins navigation to enable said vehicle to reach said theater.

23. The apparatus of claim 1, wherein said touring circuitry is further configured to manage said immersion tour upon said vehicle having reached said touring theater and having begun to traverse said path through said touring theater.

24. The apparatus of claim 1, wherein said augmented-reality system is a first augmented-reality system, wherein said first augmented reality system controls said vehicle, wherein said apparatus further comprises a second augmented-reality system, wherein said touring circuitry provides control signals to said second augmented-reality system, and wherein said second augmented-reality system causes an event to occur in said theater in response to location of said vehicle, wherein said apparatus further comprises an itinerary database that stores an itinerary for each tour in said tour database, wherein each itinerary comprises narration to played through an audio system in said vehicle and wherein each itinerary comprises commands that are to be provided to said first and second augmented-reality systems.

25. An apparatus comprising a tour database, touring circuitry, a user interface, and an augmented reality system; wherein said tour database stores immersion tours and receives, via said user interface, a selection of an immersion tour from said immersion tours, said selection being made by an occupant of an automobile; wherein said touring circuitry manages said selected immersion tour as said automobile traverses a path through a touring theater; wherein said touring circuitry is configured to receive location information from a global-positioning system that is outside said touring circuitry and inside said vehicle and wherein said touring circuitry is further configured to provide control signals to said augmented-reality system based on a location of said vehicle in said touring theater; and wherein said control signals cause said augmented-reality system to stimulate at least two sensory inputs of said occupant.

26. An apparatus comprising a tour database, touring circuitry, and an augmented-reality system; wherein said tour database maintains a list of immersion tours, their locations, and estimates of the time required for each immersion tour and receives a selection of an immersion tour from an occupant of a vehicle, said immersion tour having been selected from a plurality of immersion tours; wherein said touring circuitry manages said selected immersion tour as said vehicle traverses a path through a touring theater that corresponds to said selected immersion tour; wherein said touring circuitry is configured to receive location information from a global-positioning system that is external to said touring circuitry and inside said vehicle, wherein said location information provides a location of said vehicle in said touring theater, wherein said touring circuitry is further configured to provide to said tour database a selection of an immersion tour, to retrieve an itinerary for said immersion tour, to use said itinerary to select control signals for said itinerary, and to provide said control signals to said augmented-reality system based on said location of said vehicle in said touring theater; wherein said control signals cause said augmented-reality system to stimulate at least two sensory inputs of a passenger; and wherein said touring circuitry is further configured to cease management of said immersion tour upon said vehicle having left said touring theater.

* * * * *